US007876580B2

(12) United States Patent  
Mayer

(10) Patent No.: US 7,876,580 B2
(45) Date of Patent: Jan. 25, 2011

(54) ROTATING CABLE STRAIN RELIEF

(75) Inventor: David W. Mayer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 72 days.

(21) Appl. No.: 11/831,016

(22) Filed: Jul. 31, 2007

(65) Prior Publication Data
US 2009/0034227 A1    Feb. 5, 2009

(51) Int. Cl.
H02B 1/20 (2006.01)
(52) U.S. Cl. ........................ 361/826; 361/825
(58) Field of Classification Search .......... 361/755, 361/825–827, 752, 790, 797, 800, 730; 439/713, 439/719, 92, 98, 465, 470, 492, 493, 607, 439/610; 174/135, 68.1, 50, 520, 53, 58
See application file for complete search history.

(56) References Cited

U.S. PATENT DOCUMENTS

| | | | | |
|---|---|---|---|---|
| 1,466,859 A * | 9/1923 | Sutton | ........................ | 211/99 |
| 3,151,576 A * | 10/1964 | Patterson | ........................ | 108/2 |
| D294,221 S * | 2/1988 | Sheftel | ........................ | D8/381 |
| 4,934,645 A * | 6/1990 | Breslow | ........................ | 248/242 |
| 5,641,296 A * | 6/1997 | Larabell et al. | ........................ | 439/342 |
| 6,590,785 B1 * | 7/2003 | Lima et al. | ........................ | 361/825 |
| 6,818,834 B1 * | 11/2004 | Lin | ........................ | 174/135 |
| 7,048,131 B2 * | 5/2006 | Gay et al. | ........................ | 211/187 |
| 2005/0162838 A1 | 7/2005 | Mayer | | |

* cited by examiner

Primary Examiner—Hung S Bui

(57) ABSTRACT

Embodiments include methods, apparatus, and systems for a cable strain relief. One embodiment includes a cable strain relief having a body for supporting cables connected to a computer. A bracket and arm connect to the body so the body can rotate to plural different locked positions.

20 Claims, 4 Drawing Sheets

ROTATING CABLE STRAIN RELIEF

BACKGROUND

Rack systems generally support a plurality of computer components, such as Web-servers, security systems, applications servers, data servers, and other servers and network components. Many of these computer components have a large number of cable connections that complicate the handling and mounting of the components within the rack structure.

The cables attached to the computers need to be carefully managed in order to avoid damage to connectors and other electronic components. For instance, when computers are moved into and out of a rack, the attached cables are subject to strain that can damage connectors at the computers.

DETAILED DESCRIPTION

Embodiments in accordance with the present invention are directed to apparatus, systems, and methods for providing rotating cable strain relief for computers. One embodiment is a method to provide strain relief to cables in an electronics chassis. A cable strain relief supports the cables and is rotatable to various positions to provide access to electronic components of the computers. The cable strain relief protects the cables from accidentally becoming disconnected (even momentarily) from the attached computer while the computer is being moved or slid into and out of a computer rack.

In one embodiment, the cable strain relief is a horizontal bar or platform extending along a length of a computer or server. The cable strain relief attaches to a chassis and is located adjacent or beneath an input/output (IO) area of the computer. A plurality of IO cables extend into and out of the computer or rack and are supported along a top surface of the cable strain relief. In one embodiment, the cables are removably attached to the cable strain relief using, for example, hooks, Velcro straps, clamps, fasteners, etc.

When the computer or electronic device is moved into and out of the rack, the cable strain relief provides support to the cables and ensures that they do not accidentally become stretched or unplugged from their receptacles.

In one embodiment, the cable strain relief rotates along pivot points on hinges at the chassis. By way of example, the cable strain relief includes hinge points and plunger pins connected to the strain relief bar so that the bar can be toollessly positioned between a nominal position, a shipping position, and one or more angled positions, for instance, the strain relief bar can be rotated out of the way with cables attached to provide access to areas otherwise blocked in the nominal position. In one embodiment, the cable strain relief rotates up to about 180 degrees and is movable between an upright position and several extended or angled positions.

Movement or rotation of the cable strain relief allows access to portions of the chassis that would be blocked by a fixed position bar. Exemplary embodiments thus enable cables to be unlatched while the computer is fully positioned or slid into the rack. Movement or rotation of the cable strain relief also permits adding and removing printed circuit assemblies, accessing switches, etc. Further, during shipping, the cable strain relief can be rotated to an upright position to reduce packaging costs and potential product damage.

Figure 1:
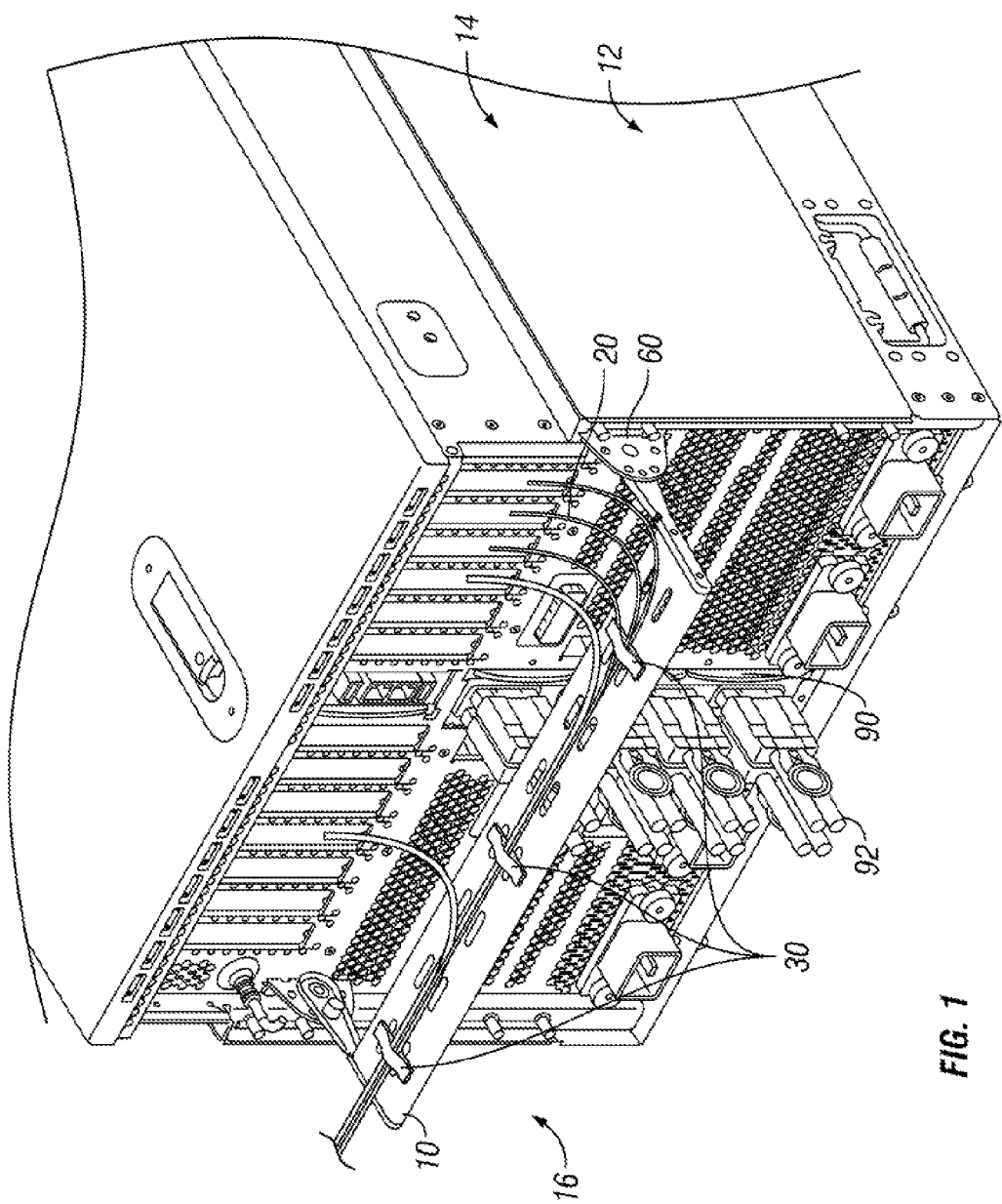
FIG. 1 is a perspective view of a cable strain relief on a computer chassis of a rack in accordance with an exemplary embodiment.
Figure 2:
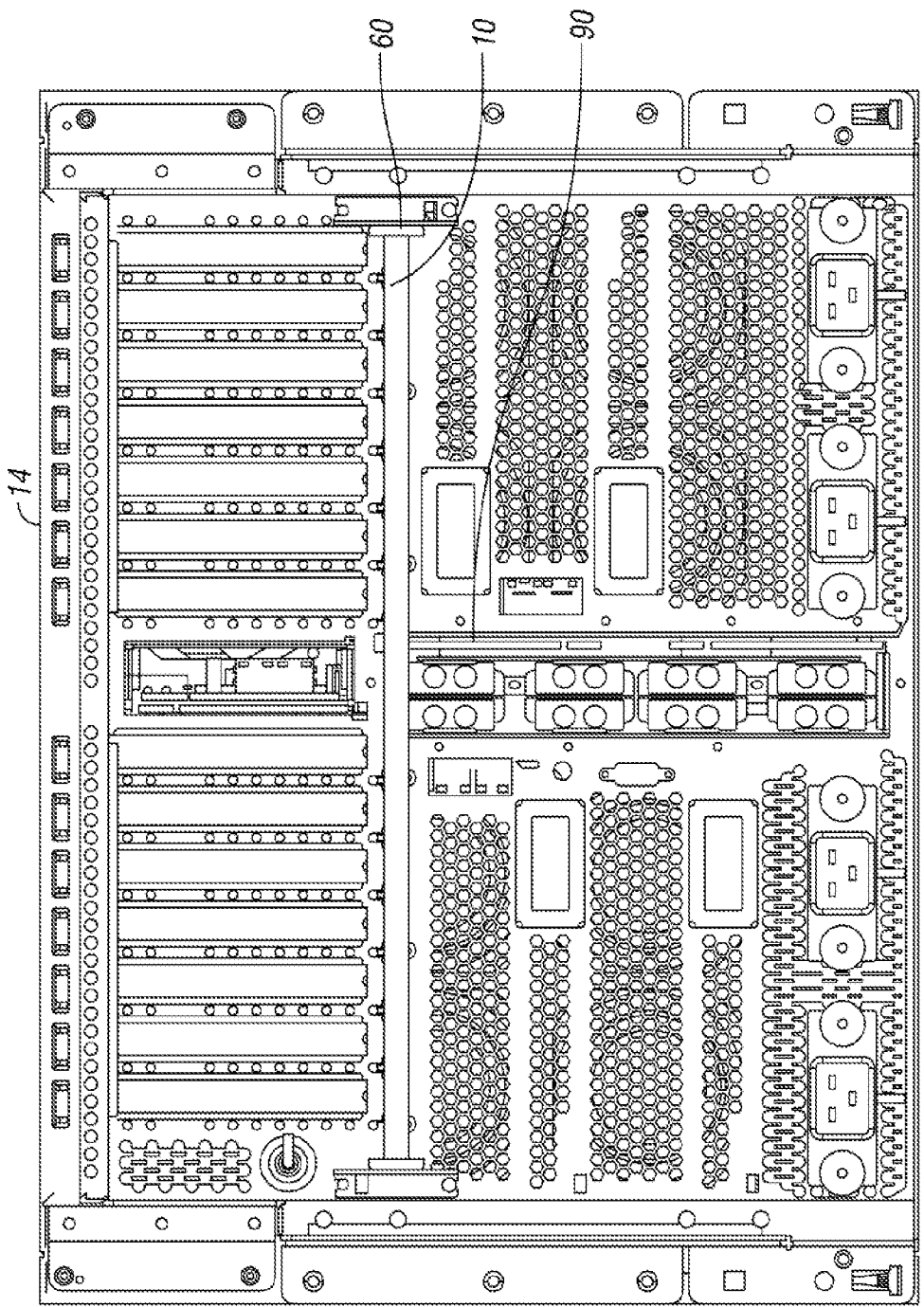
FIG. 2 is a rear view of the cable strain relief on the computer chassis of FIG. 1 in accordance with an exemplary embodiment.

FIGS. 1 and 2 show a cable strain relief 10 on a computer chassis 12 of a computer 14 in accordance with an exemplary embodiment. The computer 14 includes a rear or back end 16 having a plurality of input/output (IO) cables 20 that connect to the computer. In one exemplary embodiment the computer 14 is a server or other electronic device that attaches to chassis 12 and is positioned into a rack. Racks store or house a plurality of stacked computers in an enclosure.

The cable strain relief 10 organizes and supports the cables 14 extending into and out of the computer 14. A securing mechanism 30 holds the cables along atop surface of the cable strain relief. By way of example, the securing mechanism 30 includes, but is not limited to, one or more of Velcro straps, hooks, clamps, fasteners, ties, or other devices to removably attach and secure the cables to the cable strain relief.

Figure 3A:
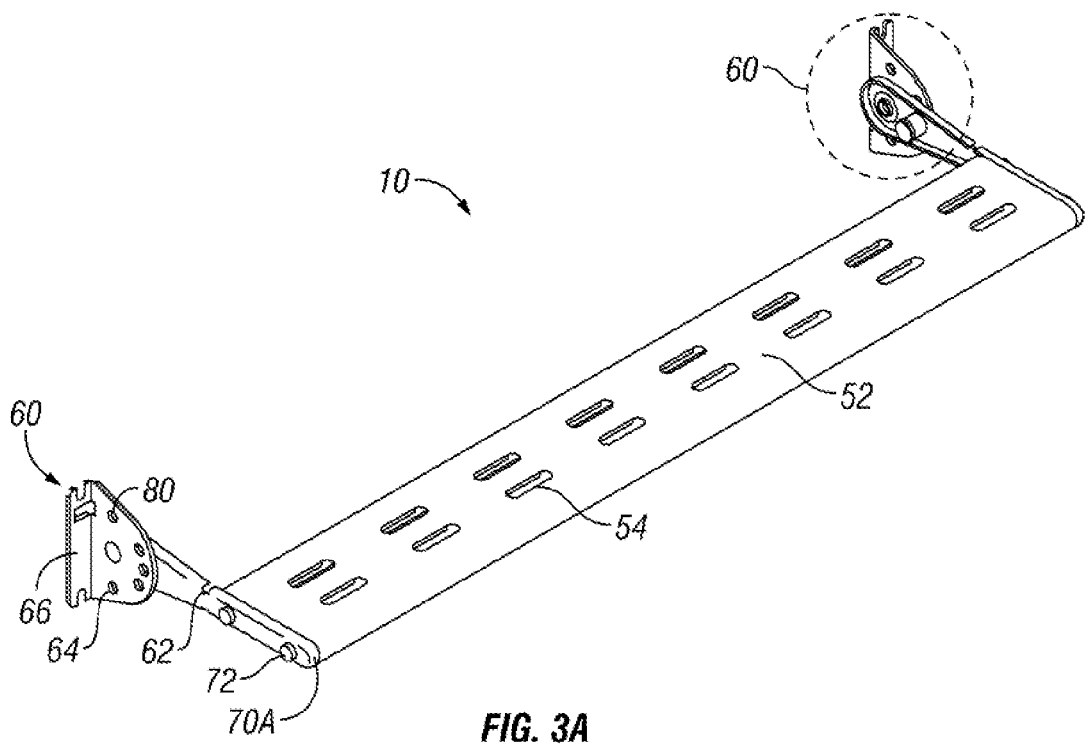
FIG. 3A is a perspective view of a cable strain relief in accordance with an exemplary embodiment.
Figure 3B:
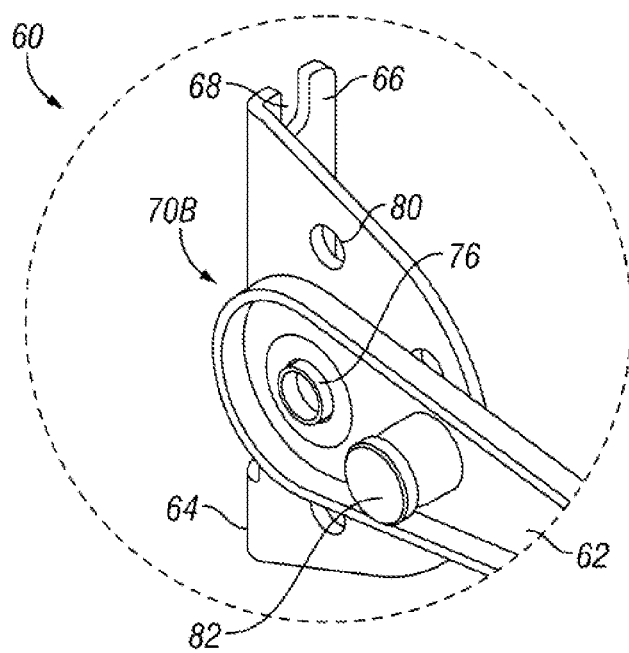
FIG. 3B is an enlarged perspective view of a hinge and locking mechanism of the cable strain relief in accordance with an exemplary embodiment.

Looking also to FIGS. 3A and 3B, the cable strain relief 10 includes a bar or body 50 having an elongated rectangular shape. The body 50 has a top surface 52 on which the cables 20 are positioned and supported. A plurality of holes 54 extend through the body 50. The holes 54 provide connection points for the securing mechanism 30.

Each end of the body 50 has a hinge and locking mechanism 60. Each hinge and locking mechanism 60 includes an extension or arm 62 and a bracket 64. The bracket 64 has a back plate 66 that connects or attaches the cable strain relief 10 to the chassis 12. One or more slots or openings 68 are provided to receive fasteners for connecting the bracket to the chassis.

Each arm 62 has two ends 70A and 70B. End 70A attaches to an end of the body 50. Fasteners or connectors 72 are provided to connect the arm to the body. End 70B includes a hinge or pivot point 76 that enables the arm to rotate. In one embodiment, each arm can be rotated 180 degrees about hinge 76.

The bracket 64 has a semicircular shape with a plurality of holes or openings 80 that extend around a perimeter of the bracket. The holes are sized and shaped to receive a plunger pin 82 connected to the arm 62. The plunger pin 82 is movable into and out of engagement with the bracket 64 so the body 50 can be rotated and locked to a plurality of fixed positions. By way of example, one end of the plunger pin 82 is sized and shaped to slide into holes 80. When the plunger pin 82 is positioned in a hole 80, the arm 62 is not able to rotate about the hinge 76. As such, the arm is lacked or fixed into a position.

In one exemplary embodiment, the number of holes 80 in the bracket 64 determines the number of locking positions for the body 50. For instance, if the bracket has five holes, then the cable strain relief member is movable to live different locked positions.

In one exemplary embodiment, a user pulls or pushes on the plunger pins 82 to move the pins into and out of engagement with the holes 80 in the bracket 64. In this manner, a user can toollessly move the cable strain relief 10 between an upward vertical position, a horizontal position, a downward vertical position, and plural angled positions.

Figure 4A:
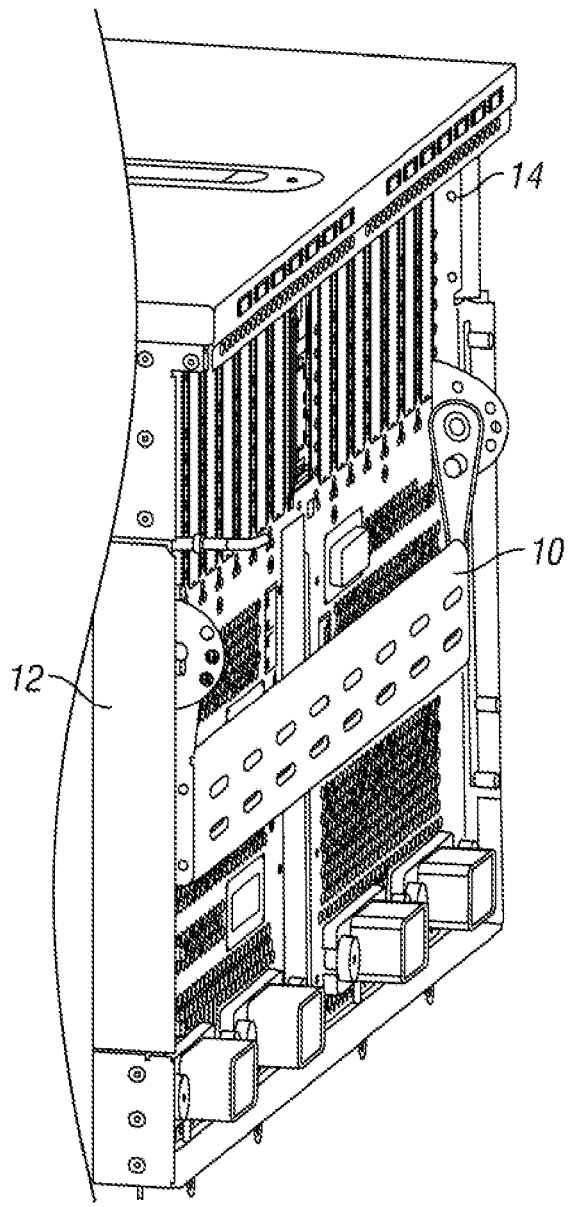
FIG. 4A is a view of a cable strain relief in an upright or vertical position in accordance with an exemplary embodiment.
Figure 4B:
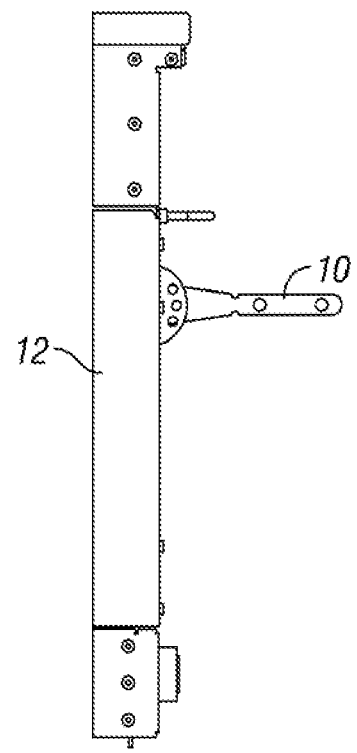
FIG. 4B is a view of a cable strain relief in an extended or horizontal position in accordance with an exemplary embodiment.
Figure 4C:
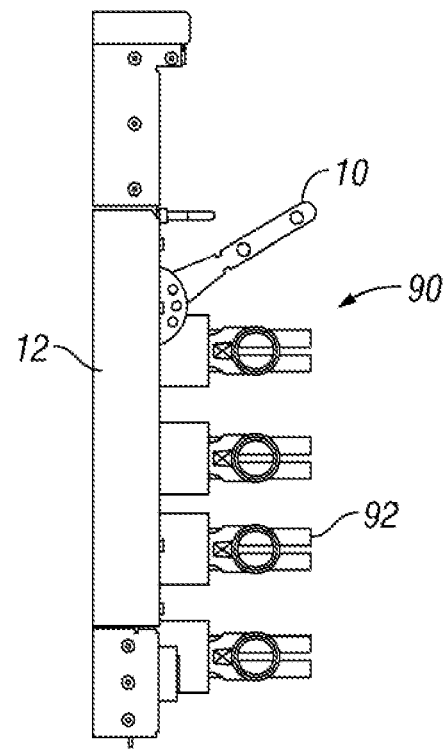
FIG. 4C is a view of a cable strain relief in a angled or rotated position in accordance with an exemplary embodiment.

FIGS. 4A-4C show some of the various positions to which the cable strain relief 10 can be rotated and locked. FIG. 4A shows the cable strain relief 10 in an upright or vertical position. In this position, the cable strain relief 10 is flush or adjacent the computer 14 so as to minimize space for shipping and packaging.

Exemplary embodiments provide a cable strain relief that can be folded into a shipping position. Additional packaging material is therefore not required if, for example, the cable strain relief were separately packaged as a separate assembly.

FIG. 4B shows the cable strain relief 10 in art extended horizontal position (see also FIG. 1). In this normal position, cables are supported and routed along a surface of the cable strain relief.

FIG. 4C shows the cable strain relief 10 in an angled position. Looking to FIGS. 1, 2, and 4C, the computer 14 includes one or more printed circuit assemblies (PCAs) 90 having a plurality of cables 92 attached to the PCA. When the cable strain relief 10 is locked in a normal or horizontal position (shown in FIG. 1), the PCA 90 cannot be removed from the computer 14. Specifically, the body of the cable strain relief 10 blocks or prevents the PCA 90 from being removed from a rear of the computer. When the cable strain relief 10, however, is rotated upwardly to a horizontal or angled position (see FIG. 4C), the PCA 90 can be slid out and removed from the computer 14.

While the cable strain relief 10 is rotated to an upright position with the cables attached to the body, a user can service or access a rear of the computer. For example, the PCA 90 can be removed, serviced, and replaced back into the computer. As another example, while the cable strain relief 10 is rotated to an angled or horizontal position, the cables are moved away from the body of the computer. In this position, a user can access or service switches, connectors, and other electronic devices located at the rear or end of the computer. Once servicing or repair is complete, a user rotates the cable strain relief back to horizontal position.

Exemplary embodiments provide a cable strain relief that can be rotated up or down, with cables attached, to provide access to components blocked by the cable strain relief. Because of rack space limitations, the cable strain relief can be moved so a user can easily access a rear portion of the rack or computer. While the cable strain relief is moved or rotated, a user can remove PCAs, unlatch cables, set switches, etc. After completing such tasks, the cable strain relief is rotated back to a horizontal position.

One exemplary embodiment is used in a computer system having a rack or enclosure housing a number of computers, such as computer systems, servers, memories, hard drives, etc. By way of example, the computers are arranged or stacked in horizontal alignment with respect to each other in the enclosure or rack. Exemplary embodiments can be practiced in various computer systems, storage systems, and other electronic environments having different configurations. By way of example, U.S. patent application having publication number 2005/0162838 A1 entitled "Multi-configurable Telecommunications Rack Mounting System and Method Incorporating Same" filed Mar. 24, 2005 is incorporated herein by reference.

The above discussion is meant to be illustrative of the principles and various embodiments of the present invention. Numerous variations and modifications will become apparent to those skilled in the art once the above disclosure is folly appreciated. It is intended that the following claims be interpreted to embrace all such variations and modifications.

What is claimed is:

1. A cable strain relief, comprising:
   a body for supporting cables connected to a computer;
   two hinged locking mechanisms attached to opposite ends of the body, each hinged locking mechanism including a bracket connected to the computer and an arm having one end with fasteners to connect to an end of the body and a second end pivotably connected to the bracket in order to rotate the body to plural different locked positions while the cables are supported on the body.

2. The cable strain relief of claim 1, wherein each arm includes a pin the moves into and out of engagement with holes located in the bracket.

3. The cable strain relief of claim 1, wherein the bracket connects to a chassis and has a semicircular shape with a plurality of openings for locking the arm.

4. The cable strain relief of claim 1, wherein the body has a width that extends along a portion between each of the arms to create an open space between both each of the arms and the two hinged locking mechanisms.

5. The cable strain relief of claim 1, wherein the body rotates 180 degrees about two pivot points while the arms are connected to the brackets.

6. The cable strain relief of claim 1 further comprising, a securing mechanism attached to a plurality of holes in the body, the securing mechanism holding the cables to the body.

7. The cable strain relief of claim 1, wherein the body rotates to a vertical position flush with the computer to minimize size during shipping of the computer and cable strain relief.

8. A method, comprising:
   attaching a plurality of cables extending from a server to an elongated body of a cable strain relief member that is in a horizontal position with respect to the server;
   rotating the cable strain relief member from the horizontal position with the cables attached to a vertical position with the cables attached in order to remove an electronic device from the server.

9. The method of claim 8 further comprising:
   servicing the electronic device;
   replacing the electronic device back into the server;
   rotating the cable strain relief member back to the horizontal position.

10. The method of claim 8 further comprising:
    rotating the body to one of plural angled positions;
    locking the body into one of the plural angled positions.

11. The method of claim 8 further comprising, rotating the body to a vertical position flush with the server in order to ship the server.

12. The method of claim 8 further comprising:
    pivotally connecting the body to a bracket connected to a chassis;
    rotating the body at a hinge connected to the bracket.

13. The method of claim 8 further comprising:
    attaching the cables to the body with Velcro connectors;
    rotating the body to one of plural different locked positions with respect to the server.

14. The method of claim 8 further comprising, pulling a pin connected to an arm of the body in order to unlock the body for rotation to one of plural different angled positions.

15. A cable strain relief, comprising:
- a body for supporting cables connected to a computer;
- an arm having a first end and a second end, the first end connected with fasteners to one end of the body;
- a bracket connected to the computer and the second end of the arm, wherein the arm rotates about the bracket to a plurality of locked positions while the cables are supported on the body.

16. The cable strain relief of claim 15, wherein the bracket has a plurality of holes for receiving a pin that locks the arm to the plurality of locked positions.

17. The cable strain relief of claim 15, wherein the body has a width that extends along a portion between each of two arms to create an open space between the two arms and two brackets connected to ends of the arms.

18. The cable strain relief of claim 15, wherein the arm includes a plunger pin that moves into and out of engagement with holes located in the bracket to secure the arm to one of the plurality of locked positions.

19. The cable strain relief of claim 15, wherein the bracket attaches to a chassis of connected to the computer and includes a hinge for rotatably connecting to the arm.

20. The cable strain relief of claim 15, wherein body as an elongated surface for supporting the cables and includes holes that connect to a securing mechanism, the securing mechanism attaching the cables to the body.

* * * * *